United States Patent
Kuo et al.

(12) 
(10) Patent No.: US 9,143,835 B2
(45) Date of Patent: Sep. 22, 2015

(54) PREVIEW AND PLAYBACK METHOD OF VIDEO STREAMS AND SYSTEM THEREOF

(71) Applicant: Wistron Corporation, New Taipei (TW)

(72) Inventors: Fang-Wen Kuo, New Taipei (TW); Po-Hsu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 91 days.

(21) Appl. No.: 13/854,159

(22) Filed: Apr. 1, 2013

(65) Prior Publication Data

US 2014/0215517 A1   Jul. 31, 2014

(30) Foreign Application Priority Data

Jan. 30, 2013 (TW) .............................. 102103550 A

(51) Int. Cl.
*H04N 21/8549* (2011.01)
*H04N 21/231* (2011.01)
*H04N 21/262* (2011.01)
*H04N 21/482* (2011.01)
*H04N 21/278* (2011.01)
*H04N 21/462* (2011.01)
*H04N 21/84* (2011.01)

(52) U.S. Cl.
CPC ......... *H04N 21/482* (2013.01); *H04N 21/4622* (2013.01); *H04N 21/84* (2013.01); *H04N 21/8549* (2013.01)

(58) Field of Classification Search
None
See application file for complete search history.

(56) References Cited

U.S. PATENT DOCUMENTS

| | | | | |
|---|---|---|---|---|
| 5,752,160 | A * | 5/1998 | Dunn | 725/93 |
| 7,712,034 | B2 * | 5/2010 | Gusmorino et al. | 715/746 |
| 2004/0205816 | A1 * | 10/2004 | Barrett | 725/49 |
| 2007/0006262 | A1 | 1/2007 | Cleron et al. | |
| 2011/0066610 | A1 * | 3/2011 | Choi et al. | 707/722 |
| 2011/0191679 | A1 | 8/2011 | Lin et al. | |
| 2012/0072946 | A1 | 3/2012 | Cranman et al. | |
| 2012/0141095 | A1 | 6/2012 | Schwesinger et al. | |

FOREIGN PATENT DOCUMENTS

JP   2009260947   11/2009

OTHER PUBLICATIONS

"Search Report of Europe Counterpart Application", issued on Apr. 29, 2014, p. 1-p. 9.

* cited by examiner

*Primary Examiner* — Brian T Pendleton
*Assistant Examiner* — Jean D Saint Cyr
(74) *Attorney, Agent, or Firm* — Jianq Chyun IP Office

(57) ABSTRACT

A preview and playback method of video streams is provided for a video playback device having network function. The method includes defining a virtual channel and a preview channel corresponding to the virtual channel. A video stream list of the virtual channel is established for linking a plurality of video streams. A preview list is established and description information of each of the preview data corresponding to the video streams is recorded in the preview list. When the video playback device receives a preview channel selection instruction, the preview data is obtained automatically and played continuously. When the video playback device receives a preview data selection instruction, the video stream corresponding to the preview data being selected is recognized as a selected video stream. The preview channel is switched to the virtual channel, and the selected video stream is obtained from a video stream service and played automatically.

18 Claims, 7 Drawing Sheets

PREVIEW AND PLAYBACK METHOD OF VIDEO STREAMS AND SYSTEM THEREOF

CROSS-REFERENCE TO RELATED APPLICATION

This application claims the priority benefit of Taiwan application serial no. 102103550, filed on Jan. 30, 2013. The entirety of the above-mentioned patent application is hereby incorporated by reference herein and made a part of this specification.

BACKGROUND

1. Field of the Invention

The present invention is directed to a preview and playback method of video streams and more particularly, to a method capable of automatically playing preview data of a plurality of independent video streams and a preview and playback system thereof.

2. Description of Related Art

A conventional TV set receives radio frequency (RF) signals from TV stations via an antenna or a cable to play cable over-the-air TV programs. In operation, a user can watch all TV programs played on a channel by simply inputting the number of the channel with a remote control. When the user is about to switch channels, he/she can do so by inputting the number of the desired channel with the remote control or by pressing down the channel up/down keys on the remote control, which is very intuitional and convenient.

However, along with the explosive growth of the Internet, video transmission through the Internet has become a new means to watch videos or TV programs. Regarding existing Internet video or Internet TV techniques, a specific application program has to be installed in advance in order to play programs provided by a corresponding online video service. To be specific, a user needs to manually start a specific application program, browse available programs, and select a desired program through the operation interface of the application program.

Moreover, the existing Internet video services typically allow the user to browse messages, such as cover photos of videos, introduction of video programs and so forth, so as to select the video program to be watched. Accordingly, the user has to change his/her operation habit of watching conventional TV programs and choose the desired program by using the four arrow keys, the "confirm/select" key, and the "enter" key on the remote control. Obviously, such an operation pattern is very complicated compared to the conventional one in which a channel is selected by directly inputting the number of the channel or pressing the channel up/down keys. Besides, since different application programs have different operation interfaces, and contents and types of programs provided through the Internet are numerous, a user has to keep his/her eyes on the screen to perform operations and correctly select the content desired to watch. Accordingly, as for the Internet video services, how to allow the user to choose a video program in easy and quick way has become an important subject.

SUMMARY

Accordingly, the present invention is directed to a preview and playback method of video streams and a system thereof, in which a video playback device automatically and continuously plays preview data of a plurality of independent video streams after a user turns on a video playback device and selects a preview channel, such that the user may quickly chooses video streams to view to improve convenience of the interne video services.

The present invention is directed to a preview and playback method of video streams adapted to a video playback device having network function. The method includes defining a virtual channel and a preview channel corresponding to the virtual channel, establishing a video stream list of the virtual channel to link a plurality of video streams provided by one or more video stream services and establishing a preview list of the preview channel, which records description information of each of a plurality of preview data corresponding to the video streams, wherein the video streams are independent from each other. The method also includes when the video playback device receives a preview data selection instruction corresponding to one of the preview data, recognizing the video stream corresponding to the preview data being selected as a selected video stream. Besides, the method includes switching from the preview channel to the virtual channel, obtaining and playing the selected video stream from one of the one or more video stream services according to the video stream list.

According to another embodiment, the present invention is directed to a preview and playback method of video streams adapted to a video playback device having network function. The method includes defining a first virtual channel, a second virtual channel and a preview channel corresponding to the first virtual channel and the second virtual channel, establishing a first video stream list of the first virtual channel to link a plurality of first video streams, wherein the first video streams are independent from each other, establishing a second video stream list of the second virtual channel to link a plurality of second video streams, wherein the second video streams are independent from each other and establishing a preview list of the preview channel, wherein the preview list records description information of each of a plurality of preview data, and the preview data corresponds to at least one of the first video streams and correspond to at least one of the second video streams. The method also includes when the video playback device receives a preview channel selection instruction corresponding to the preview channel, automatically obtaining and continuously playing the preview data according to the preview list and when the video playback device receives a preview data selection instruction corresponding to one of the preview data, recognizing the video stream corresponding to the preview data being selected as a selected video stream. Besides, the method includes switching from the preview channel to the first virtual channel or the second virtual channel corresponding to the selected video stream and obtaining and playing the selected video stream from one of the one or more video stream services according to the first video stream list or the second video stream list.

According to still another embodiment, the present invention is directed to a preview and playback system of video streams. The preview and playback system of video streams includes a network interface, a remote instruction receiving module, a non-volatile storage unit and a preview and playback module. The non-volatile storage unit records a corresponding relationship between a virtual channel and a preview channel. The preview and playback module is configured to provide a preview and playback program and coupled to the network interface, the remote instruction receiving module and the non-volatile storage unit. The preview and playback program establishes a video stream list of the virtual channel to link a plurality of video streams provided by one or more video stream services. The video streams are independent from each other. The preview and playback program establishes a preview list of the preview channel. The preview list records description information of each of a plurality of preview data corresponding to the video streams. When the remote instruction receiving module receives a preview channel selection instruction corresponding to the preview channel, the preview and playback program automatically obtains and continuously plays the preview data via the network interface according to the preview list. When the remote instruction receiving module receives a preview data selection instruction corresponding to one of the preview data, the preview and playback program recognizes the video stream corresponding to the preview data being selected as a selected video stream, and the preview and playback program switches from the preview channel to the virtual channel, automatically obtains and plays the selected video stream from one of the one or more video stream services via the network interface according to the video stream list.

According to yet another embodiment, the present invention is directed to a preview and playback system of video streams. The preview and playback system of video streams includes a network interface, a remote instruction receiving module, a non-volatile storage unit and a preview and playback module. The non-volatile storage unit records a corresponding relationship between a first virtual channel and a preview channel and a corresponding relationship between a second virtual channel and the preview channel. The preview and playback module is configured to provide a preview and playback program and coupled to the network interface, the remote instruction receiving module and the non-volatile storage unit. The preview and playback program establishes a first video stream list of the first virtual channel to link a plurality of first video streams independent from each other and a second video stream list of the second virtual channel to link a plurality of second video streams independent from each other and a preview list of the preview channel. The preview list records description information of each of a plurality of preview data, wherein the preview data corresponds to at least one of the first video streams and at least one of the second video streams. When the remote instruction receiving module receives a preview channel selection instruction corresponding to the preview channel, the preview and playback program automatically obtains and continuously plays the preview data via the network interface according to the preview list. When the remote instruction receiving module receives a preview data selection instruction corresponding to one of the preview data, the preview and playback program recognizes the video stream corresponding to the preview data being selected as a selected video stream, switches from the preview channel to the first virtual channel or the second virtual channel corresponding to the selected video stream and automatically obtains and plays the selected video stream from one of the one or more video stream services via the network interface according to the video stream list.

To sum up, in the present invention, the preview list of the preview channel may be established according to the video streams on the virtual channel, such that a user may preview the preview data of the video streams by viewing the preview channel. When the user chooses the preview channel, the video playback device automatically and continuously plays the preview data in the preview list. As such, after selecting the video stream to view according to the preview data, the user may quickly switch from the preview channel to the virtual channel where the video streams is located and start to viewing the video stream which is selected. Accordingly, operation steps for the user to select among various types of video streams are simplified, so that the convenience for watching video streams files is improved.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

The present invention is directed to a preview and playback method of video streams, in which a conventional method of selecting TV channels is applied to Internet videos. By establishing a virtual channel, a user may directly watch automatically and continuously played video streams provided by one or more video stream services after turning on a video playback device and selecting the virtual channel. Additionally, in the present invention, a preview channel is established for the user to watch preview data of a portion of or the entire video streams on each virtual channel through the preview channel. As such, after selecting one of the preview data on the virtual channel, the user may quickly switch to the virtual channel and start to watch a video stream file corresponding to the selected preview data. Accordingly, the user may choose a video stream file which he/she desires to watch in easier and quicker way. In order to make the content of the present invention clearer, the following embodiments are illustrated as examples that can be truly implemented by the present invention.

Figure 1:
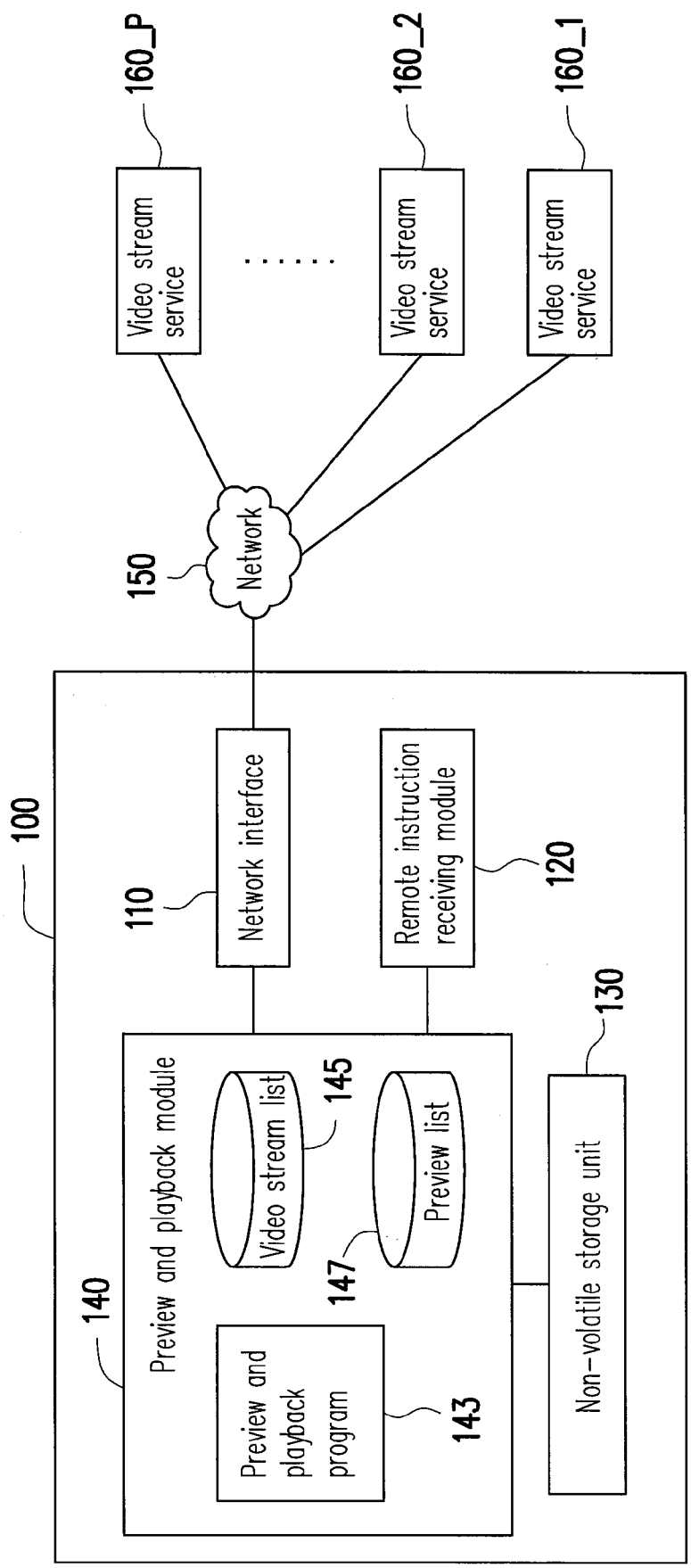
FIG. 1 is a schematic diagram illustrating a preview and playback system of video streams according to an embodiment of the present invention.

FIG. 1 is a schematic diagram illustrating a preview and playback system of video streams according to an embodiment of the present invention. Referring to FIG. 1, a video stream preview and playback system 100 includes a network interface 110, a remote instruction receiving module 120, a non-volatile storage unit 130 and a preview and playback module 140. In the present embodiment, the video stream preview and playback system 100 may be configured in a video playback device having network function. The video playback device is, for example, a smart TV, a network TV, a smart phone or a computer system, which is equipped with a display itself. Alternatively, the video playback device may be a DVD player, a media box or the like which is not equipped with a display.

The network interface 110 is, for example, a wired network card, a wireless network card or any other physical-layer component, and the present invention is not intent to limit the communication protocol adopted by the network interface 110. The network interface 110 may be a network interface installed in the video playback device which the video stream preview and playback system 100 is configured therein. For instance, if the video stream preview and playback system 100 is configured in the video playback device having network function, the network interface 110 may be a wireless network card installed in the video playback device. The video stream preview and playback system 100 accesses a network 150 via the network interface 110.

The remote instruction receiving module 120 is configured to receive remote signals sent from an apparatus, such as a remote control, and transforms the received remote signals into corresponding operation instructions. The video stream preview and playback system 100 may perform corresponding operations according to the operation commands.

The non-volatile storage unit 130 may be built in the video stream preview and playback system 100 or externally connected with the video stream preview and playback system 100 through a connection port and a transmission wire. The non-volatile storage unit 130 uses, for example, a flash memory as a storage medium, but the present invention is not limited thereto.

The preview and playback module 140 is coupled to the network interface 110, the remote instruction receiving module 120 and the non-volatile storage unit 130. The preview and playback module 140 is configured to provide the preview and playback program 143. In the present embodiment, the preview and playback module 140 includes one or more hardware elements (for example, processors, chipsets, controllers, or specific circuits and storage units) and/or one or more software components (for example, software modules or functions exclusively designed for implementing specific functions) that allows the preview and playback program 143 to work properly. The preview and playback program 143 utilizes various services provided by one or more video stream services 160_1~160_P via the network interface 110, such as playing the video stream provided by the video stream service 160_1 in real time, wherein P is an integer greater than or equal to 1.

Figure 2:
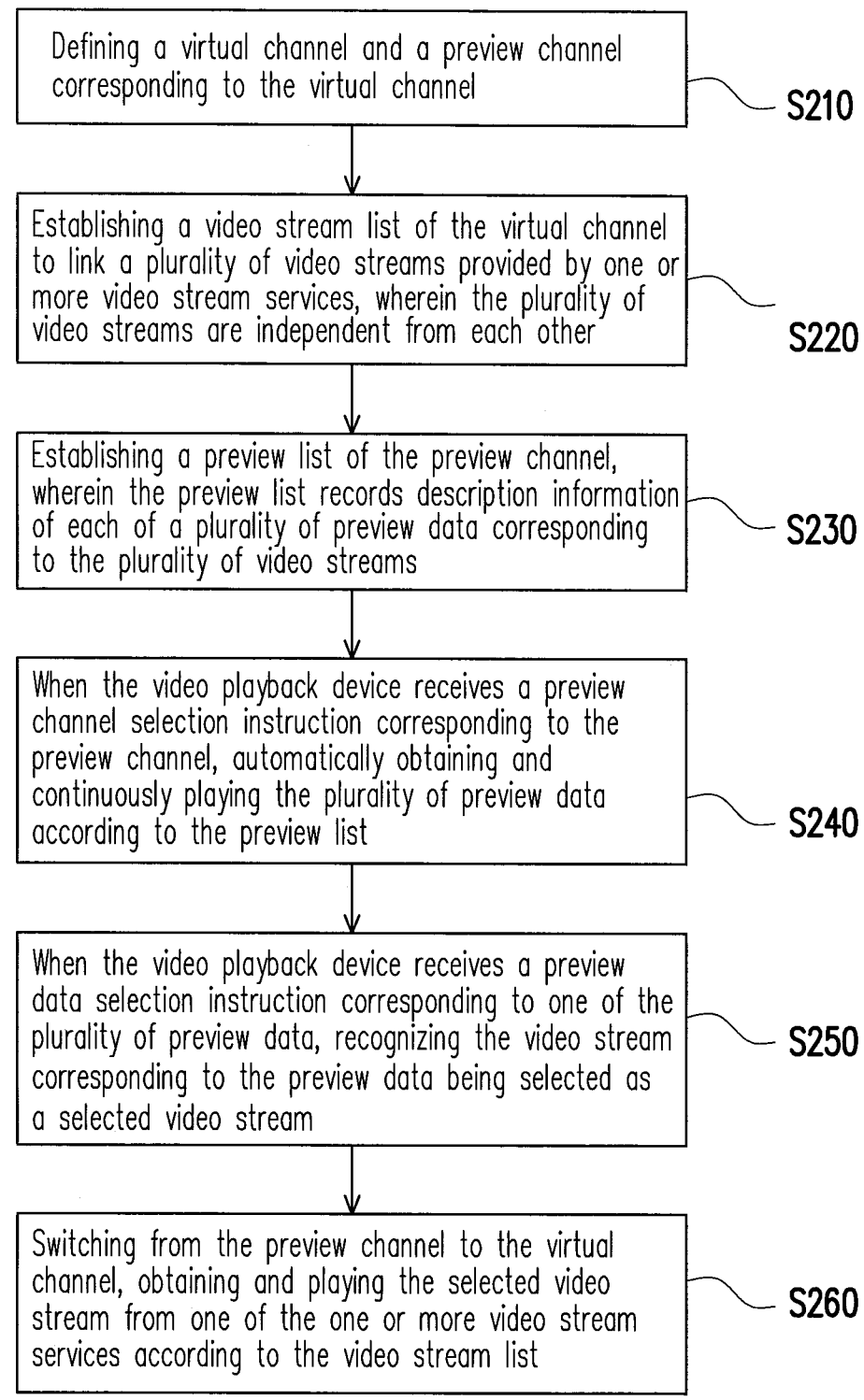
FIG. 2 is a flowchart illustrating a preview and playback method of video streams according to an embodiment of the present invention.

Referring to FIG. 1 and FIG. 2, the detailed operation of the video stream preview and playback system 100 will be described with reference to FIG. 2 hereinafter.

FIG. 2 is a flowchart illustrating a preview and playback method of video streams according to an embodiment of the present invention. First, in step S210, a virtual channel and a preview channel corresponding to the virtual channel are defined. Such corresponding relationship is recorded in the non-volatile storage unit 130. The corresponding relationship between the virtual channel and the preview channel may be predetermined by the system or defined by the user. In the present embodiment, the video stream preview and playback system 100 is capable of playing a plurality of virtual channels and the preview channel corresponds to one of the aforementioned virtual channels. In other words, after the corresponding relationship between the virtual channel and the preview channel is defined, the user may perform a preview operation on a specific virtual channel by the preview channel.

In step S220, a video stream list 145 of the virtual channel is established by the preview and playback program 143 to link a plurality of video streams provided by one or more video stream services among the video stream services 160_1~160_P, and the video streams are independent from each other. In the present embodiment, the video stream list 145 may include a uniform resource locator (URL) of each video stream. In addition, the video stream list 145 may also include information of each video stream, such as a name, a content type, a length, a copyright owner or an update time, but the present invention is not limited thereto. For instance, by setting a search keyword, the user may search out a part of or all video stream files provided by the one or more of the video stream services 160_1~160_P, and record an individual URL of each of the video streams which matches the search keyword to the video stream list 145. Alternatively, the user may lock all video stream files provided by one of the video stream services 160_1~160_P and record an individual URL of each of the locked video stream files to the video stream list 145, such that the virtual channel is dedicated to play the video stream files provided by a specific video stream service.

It is to be mentioned that the preview and playback program 143 may include a plurality of applications which are used to play different types of video stream files. For example, types of the video stream files as provided may vary with the video stream services. Thus, in another embodiment, the video streams required to be played by the same application may be recorded in the video stream list 145 by using system settings. That is to say, as for a single virtual channel, the video stream files may be played by a single application, or different types of video stream files may be played by various applications. The video stream files linked with the same video stream list 145 may be provided either by a video stream service or by a plurality of video stream services. In other words, a virtual channel may obtain resources of the video streams from either a video stream service or a plurality of video stream services by either a single application or a plurality of applications.

Next, in step S230, the preview and playback program 143 establishes a preview list 147 of the preview channel. The preview list 147 records description information of each of a plurality of preview data corresponding to the video streams. In brief, the preview list 147 records a plurality of preview data to be played in the preview channel, and each preview data has its own description information. The description information of the preview data may include a preview data identification code, a preview data playback length, a preview data type, a preview data playback manner, a preview data stored location and a program name and a URL of the corresponding video stream. It is to be mentioned that the preview list 147 may either record the preview data of all the video streams in the virtual channel or the preview data of a part of the video streams in the virtual channel, which may be determined according to the setting by the user's or the system, and the present invention is not limited thereto. That is to say, the content to be played by the preview channel may be determined by the preview and playback program 143 establishing the preview list 147 of the preview channel, including which video streams in the virtual channel are to be previewed, in which style/manner each preview data is to be played and from where the preview and playback program 143 may obtain files of the preview data.

It is to be explained that the way for the preview and playback program 143 to establish the preview list 147 may include obtaining the description information for each video stream from the video stream service providing the video streams, generating the description information according to a search result or generating the description information according to the video stream. In detail, the preview and playback program 143 may also configure a plurality of preview video streams provided by the one or more video stream services 160_1~160_P as the preview data corresponding to the video streams. Additionally, the preview and playback program 143 may also collect images or films related to the video streams by searching over the Internet, and configure the collected information as the preview data of the video streams. Moreover, the preview and playback program 143 may also self-generate the preview data of the video streams, such as by capturing a part of a complete video stream file as the preview data of a video stream. Therein, the preview data type corresponding to the preview data of each of the video streams is identical or different. That is to say, the preview data continuously played in the preview channel may be the same type or different types.

In the present embodiment, the preview data type of the preview data may be determined according to the settings by the user or the system. For example, the preview and playback program 143 may establish a preview rule to determine the preview data corresponding to each of the video streams. First, the preview and playback program 143 determines whether the video stream services provide the preview video streams of the video streams. If yes, the preview and playback program 143 configures the preview video streams provided by the one or more video stream services 160_1~160_P as the preview data corresponding to the video streams. If the video stream services do not provide the preview video streams of the video streams, the preview and playback program 143 starts to search for related information on the Internet and determine whether images related to the video stream services are collected. If the images related to the video streams are collected, the preview and playback program 143 configures one or more images corresponding to the video streams as the preview data corresponding to the video streams. If the preview and playback program 143 is not capable of obtaining the preview data for a certain video stream either from the Internet or from any one of the video stream services, the preview and playback program 143 may self-generate preview data by using the complete video stream in the virtual channel. For instance, the preview and playback program 143 gets a segment (clip) from the complete video stream file, wherein the segment is associated with a time interval and thus has a capture start time point and a capture end time point set by the preview and playback program 143. The preview and playback program 143 regards the segment as the preview data corresponding to the video stream. Although how to determine the preview data has been describe above, the present invention is not limited thereto, and it may also be setting all preview data as the same preview data type or changing the rule of determining the preview data according to the user's settings.

Then, in step S240, when the remote instruction receiving module 120 receives a preview channel selection instruction corresponding to the preview channel, the preview and playback program 143 automatically obtains and continuously plays the preview data according to the preview list 147. That is to say, when the user issues an instruction of viewing the preview channel to the video playback device, the preview and playback program 143 obtains the preview data of each of the video streams from various sources and continuously plays the preview data according to the description information of the preview list 147. For example, the preview and playback program 143 obtains preview clips or scene photos from the video stream services according to the description information, obtains related photos by searching over the Internet or further obtains partial content from the complete video streams. It is to be mentioned that the preview and playback program 143 used for establish the preview list 147 and play the preview data may include applications used for playing the video streams in the virtual channel and applications dedicated to manage the preview channel. However, no matter whether the preview and playback program 143 provided by the preview and playback module 140 may be implemented as either one application or a plurality of applications, either the virtual channel or the preview channel have video has a video playback list corresponding thereto. Thus, when the remote instruction receiving module 120 receives a virtual channel selection instruction, the preview and playback program 143 plays the video streams according to the video stream list 145. When the remote instruction receiving module 120 receives the preview channel selection instruction, the preview and playback program 143 plays the preview data according to the preview list 147.

Afterward, in step S250, when the remote instruction receiving module 120 receives a preview data selection instruction corresponding to one of the preview data, the preview and playback program 143 recognizes the video stream corresponding to the preview data being selected as a selected video stream. In other words, after viewing the preview data in the preview channel, the user may pick the video stream that he/she desires to view according the preview data and issue the preview data selection instruction corresponding to the preview data. For example, when the preview channel plays the preview data corresponding to the video streams which the user desires to watch, the user may press the confirm key on the remote control, and thus, the video stream corresponding to the preview data being selected will be recognized as the selected video stream. Additionally, if the remote instruction receiving module 120 does not receive the preview data selection instruction, the preview and playback program 143 continuously plays the preview data according to the preview list 147. In an embodiment, the preview and playback program 143 periodically refreshes the preview list 147, and a time point for refreshing may be, for example, a predetermined time point everyday, a time point when an update notification of the video data provided from the one or more video stream services 160_1~160_P is received through the Internet, a time point when a preview channel selection instruction corresponding to the preview channel which is issued by the user is received, or a time point when a user forcible update instruction issued by the user is received. However, the time point of in the present invention to refresh the preview list is not limited thereto.

Finally, in step S260, the preview and playback program 143 switches from the preview channel to the virtual channel and obtains the selected video stream from the one or more video stream services 160_1~160_P and play the same according to the video stream list 145. In detail, the preview and playback program 143 sends a request for a URL corresponding to the selected video stream to the video stream service (i.e., one of the video stream services 160_1~160_P) providing the selected video stream through the network so as to play the selected video stream on the video playback device in real time. Additionally, after the playback of the selected video stream is finished, the virtual channel is already switched to, the preview and playback program 143 continuously plays other complete video stream files in the virtual channel according to the video stream list 145. However, if the remote instruction receiving module 120 received again the preview channel selection instruction corresponding to the preview channel, the preview and playback program 143 switches from the virtual channel to the preview channel and automatically obtains and continuously plays the preview data according to the preview list 147. As such, the user may switch to the preview channel to automatically play preview data of all programs, without picking programs one by one for previewing. The detailed process of automatically obtaining and continuously playing the preview data according to the preview list will be described with reference to FIG. 3.

First, in step S310, the preview and playback program 143 chooses one current preview data from all of the plurality of preview data. In detail, the preview list 147 records the preview data of each of the video streams according to various settings or rules. When the user issues a preview channel selection instruction, the preview and playback program 143 chooses one current preview data from the plurality of preview data so as to start to play the current preview data in the next step. In step S320, the preview and playback program 143 obtains the current preview data according to a preview data stored location corresponding to the current preview data. After selecting the preview data to be played, the preview and playback program 143 may read the preview data stored location corresponding to the preview data from the preview list and obtains the preview data from the preview data stored location via the network interface 110 over the network 150.

Then, in step S330, the preview and playback program 143 plays the current preview data according to a preview data playback length, a preview data type and a preview data playback manner corresponding to the current preview data. In brief, the preview and playback program 143 performs the playback operation according to the description information of each preview data. For example, if the preview data playback length is 1 minute, the preview data type is photos, the preview data playback manner is to play one photo per 20 seconds, and three photos are chosen for playing, the user will view the preview data being played for 1 minute. Meanwhile, the three photos are continuously played in turn within 1 minute, each photo stays on the screen for 20 seconds; however, the present invention is not limited thereto. If the preview data playback length is 2 minutes, the preview data type is captured clips and the preview data playback manner is to capture a part of the video stream from a time point of 5'20" to 7'20" of the complete video stream for playback, the user will view the preview data being played for 2 minutes. The preview and playback program 143 will play partial video stream starting from the time point of 5'20" to the time point 7'20" of the complete video stream. Thus, the user will view a part of frames of the complete video stream file. It is to be mentioned that as for the captured clips, it may be either a time-continuous part of the video stream or two parts of the video stream captured from the complete video stream, wherein the two parts of the video stream are not continuous. For example, the preview and playback program 143 may capture one part of the video stream having a playback time starting from 1'30" to 2'00" and another part of the video stream having a playback time starting from 10'30" to 11'00", respectively and configure the two parts of the video stream respectively lasting for 30 seconds as the preview data corresponding to the video stream.

Finally, in step S340, the preview and playback program 143 repeats the steps of choosing the current preview data, obtaining the current preview data and playing the current preview data until the playback of all the preview data is finished. In other words, the preview and playback program 143 plays the preview data of each video stream in turn. It is to be noticed that a sequence of the preview data in the preview list 147 is the same or different from a sequence of the preview data video streams in the virtual channel. That is to say, the sequence of playing the preview data in preview channel and the sequence of playing the video streams in the corresponding virtual channel may be different. For instance, as for the $5^{th}$ video stream to be played in the virtual channel, its corresponding preview data may be the $3^{rd}$ to be played in the preview channel. In detail, the sequence of the preview data in the preview list depends on one of a length, a view rate and a recommended rate of the corresponding video stream. Accordingly, the playback sequence of each preview data in the preview channel is quite flexible, and the user may set the playback sequence of the preview data according to his/her type preference, the popularity of the video stream or his/her habit for viewing the video stream files.

Figure 3:
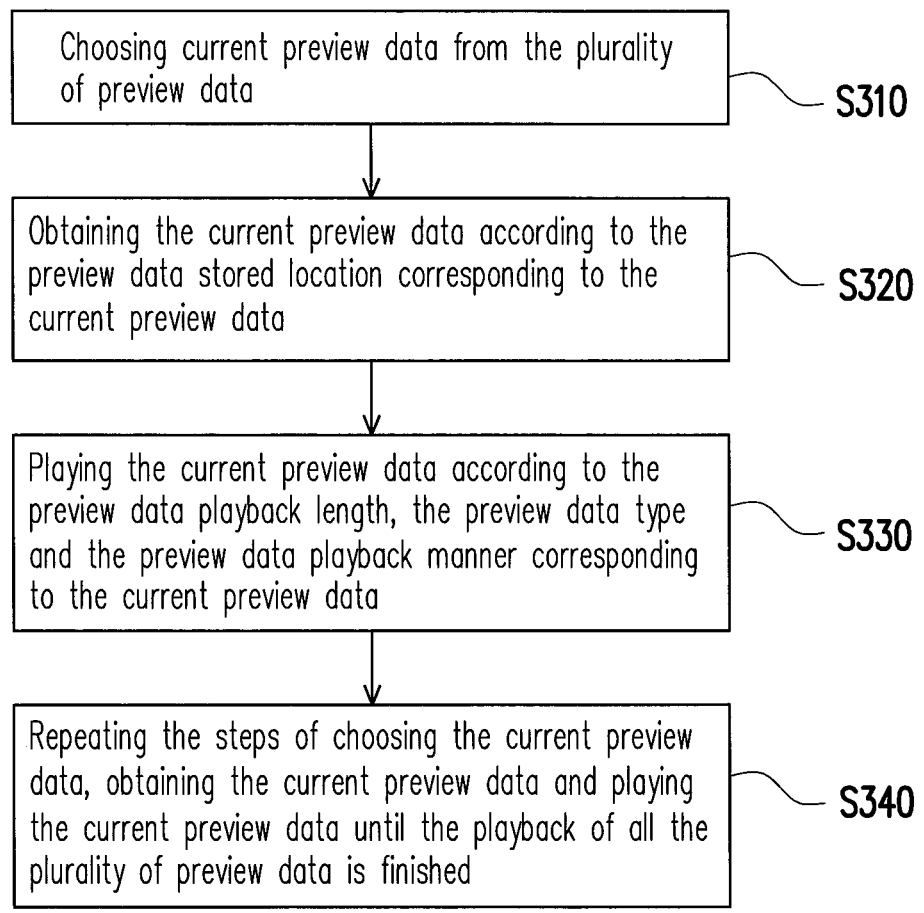
FIG. 3 is a flowchart of the preview and playback program automatically and continuously playing the preview data according to the preview list according to an embodiment of the present invention.

Based on the above, as shown in FIG. 2 and FIG. 3, the user merely needs to choose the preview channel by using the remote control, the video playback device automatically and continuously plays the plurality of preview data of the preview channel. Meanwhile, according to the user's video type preference, the video playback device may configure collected related programs, excerpts of the content from each of the related programs or from each existing commercial film as preview clips and link the above contents for preview playback. As such, the user may pick the video streams that he/she actually wants to view from the video streams in the virtual channel through viewing the preview channel and view the video streams provided by different video stream services in a way like operating a traditional TV.

Figure 4:
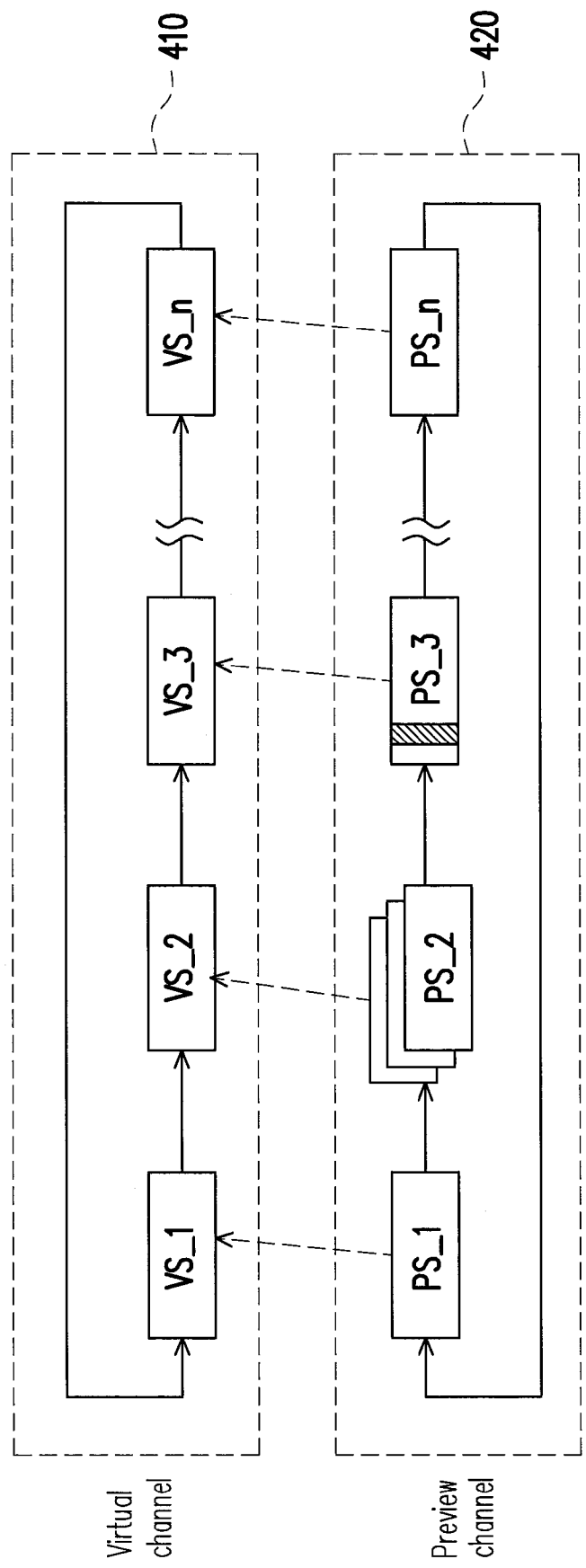
FIG. 4 is a schematic diagram of playing the preview data according to an embodiment of the present invention.

FIG. 4 is a schematic diagram of playing the preview data according to an embodiment of the present invention. Referring to FIG. 4, it is assumed that a video stream list 410 includes n video streams VS_1 through VS_n, a preview list 420 includes n preview data PS_1 through PS_n, wherein n is an integer greater than 0. As shown in FIG. 4, the virtual channel is linked with n Internet video streams VS_1 through VS_n, and the preview channel is linked with the preview data PS_1 through PS_n of each video stream of the virtual channel. When switching to the preview channel, the user may watch the preview data that is automatically loop-played. While watching the preview data, the user may issue a preview data selection instruction to the video playback device in way like clicking on a confirm or select key on the remote control, the video playback device is switched from the preview channel to the virtual channel and plays the corresponding complete video stream. For example, when the user clicks on the confirm or select key on the remote control while watching the preview data PS_1, the channel played by the video playback device is switched form the preview channel to the virtual channel and starts to play the video stream VS_1. Additionally, the preview data type of each preview data may be different. For instance, as shown in FIG. 4, the preview data PS_1 is the preview video provided by a video stream service, the preview data PS_2 is a related photo searched over the Internet, and the preview data PS_3 is a captured clip generated by capturing the video stream VS_3.

It is to be specially mentioned that in the aforementioned embodiment, the description is made based on one virtual channel corresponding to one preview channel, but the present invention is not limited thereto. In other words, a preview channel may also correspond to a plurality of virtual channels. When the user chooses a preview channel, a preview list collects preview data of video streams in a plurality of virtual channels. That is to say, the user previews the preview data of a part of or all of the video streams in the plurality of virtual channels through the preview channel Another embodiment where a preview channel may correspond to one or more virtual channels will be illustrated hereinafter, and namely, in this embodiment, the preview data of each individual video stream of different virtual channels will be automatically and continuously played after the user chooses the preview channel.

Figure 5:
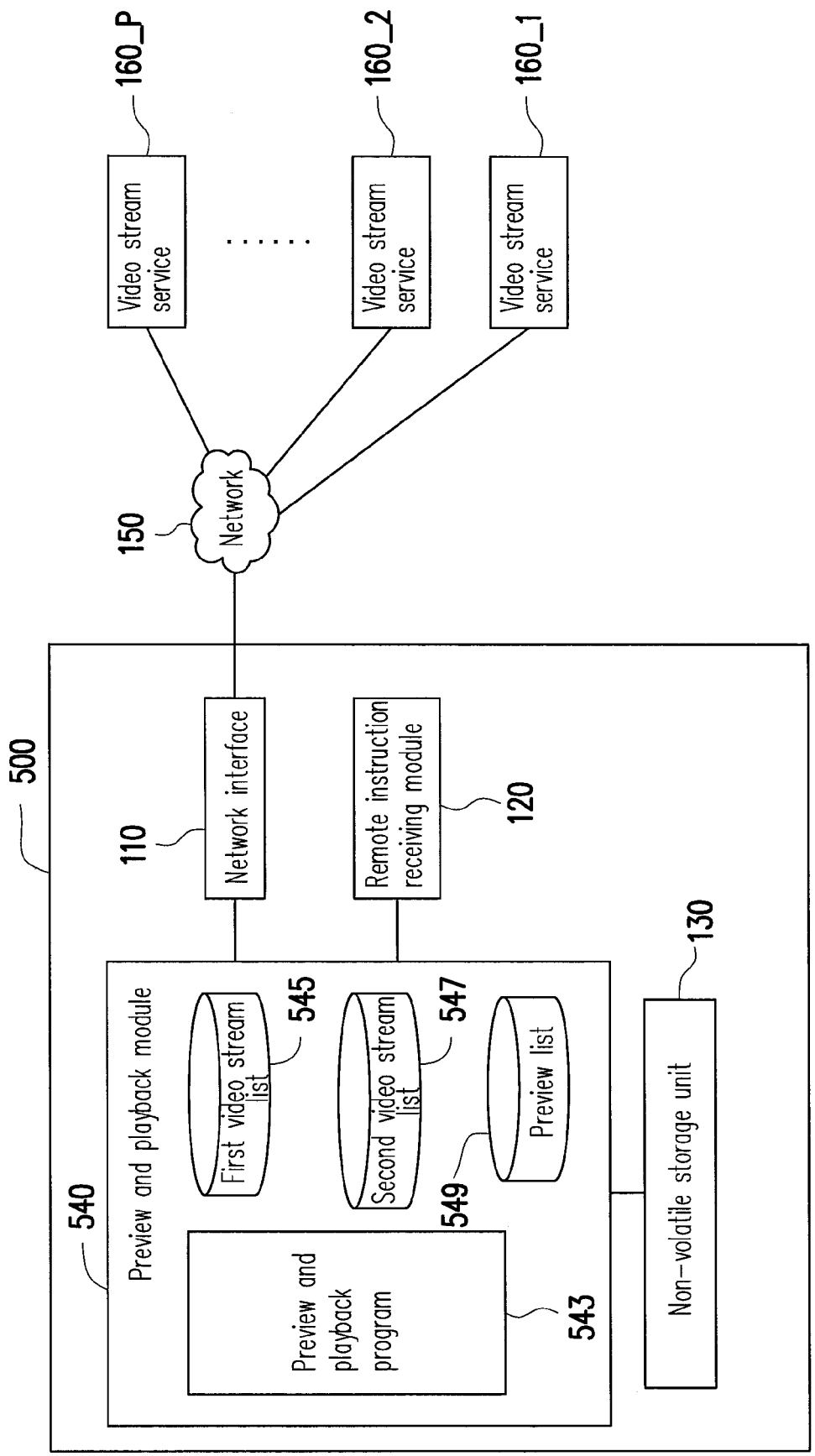
FIG. 5 is a schematic diagram of a preview and playback system of video streams according to another embodiment of the present invention.

FIG. 5 is a schematic diagram of a preview and playback system of video streams according to another embodiment of the present invention. Referring to FIG. 5, a review and playback system of video streams 500 includes the network interface 110, the remote instruction receiving module 120 and the non-volatile storage unit 130. The network interface 110, the remote instruction receiving module 120 and the non-volatile storage unit 130 have the functions which are the same or similar to the elements illustrated in FIG. 1 and will not repeatedly described hereinafter.

It is to be noticed that in the present embodiment, the review and playback system of video streams 500 further includes a preview and playback module 540. The preview and playback module 540 is coupled to the network interface 110, the remote instruction receiving module 120 and the non-volatile storage unit 130. The preview and playback module 540 includes the preview and playback program 543. In the present embodiment, the preview and playback module 540 includes one or more hardware elements (for example, processors, chipsets, controllers, or specific circuits and storage units) and/or one or more software components (for example, software modules or functions exclusively designed for implementing specific functions) that allows the preview and playback program 543 to work properly. The preview and playback program 543 utilizes various services provided by the one or more video stream services 160_1~160_P via the network interface 110, such as playing the video stream provided by the video stream service 160_1 in real time.

Figure 6:
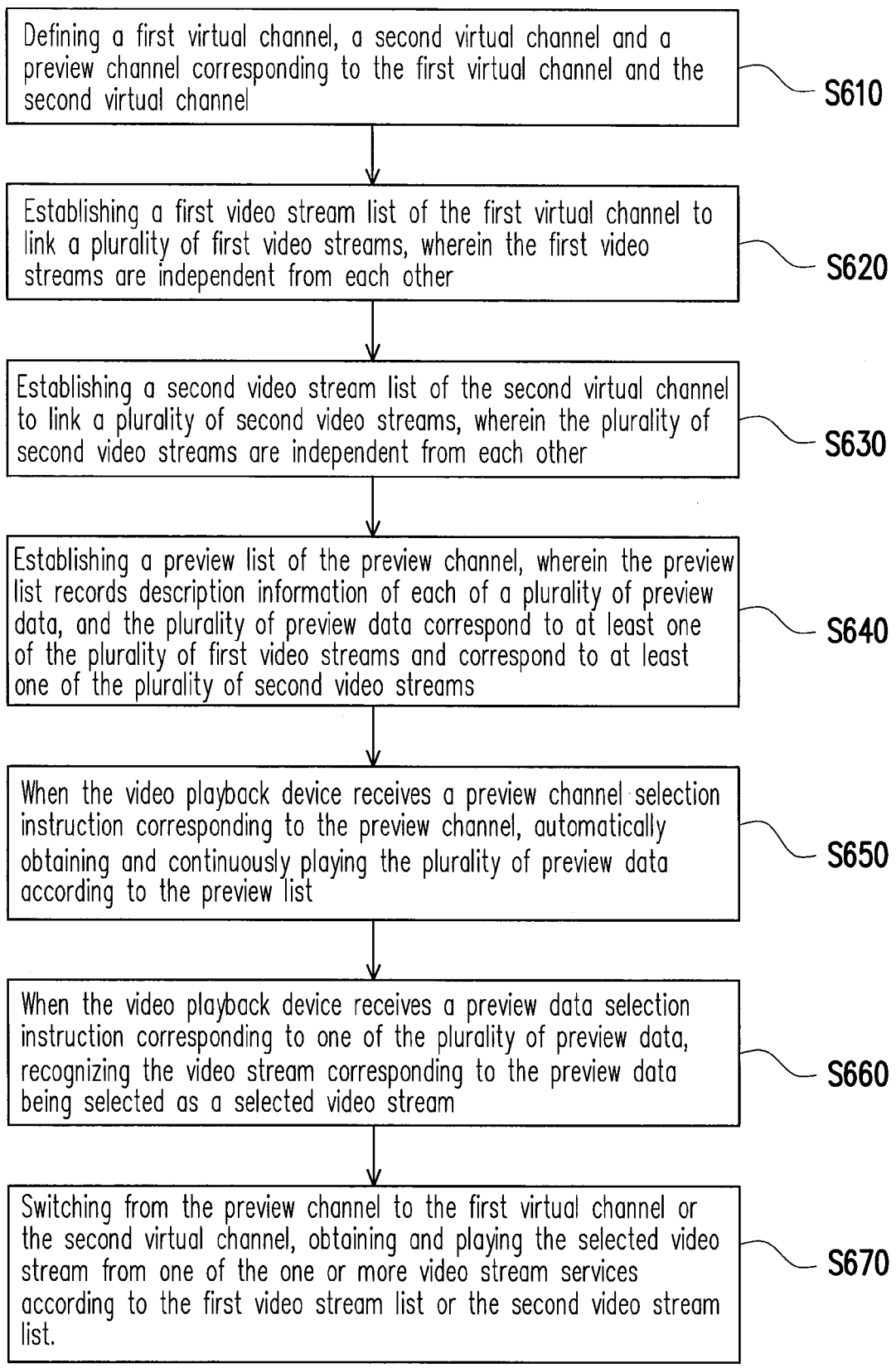
FIG. 6 is a flowchart illustrating a preview and playback method of video streams according to another embodiment of the present invention.

FIG. 6 is a flowchart illustrating a preview and playback method of video streams according to another embodiment of the present invention. First, in step S610, a first virtual channel, a second virtual channel and a preview channel corresponding to the first virtual channel and the second virtual channel are defined. Such corresponding relationship is recorded in the non-volatile storage unit 130. In the present embodiment, the user may perform a preview operation on the first virtual channel and the second virtual channel through the preview channel. In other words, the preview channel may correspond to a plurality of virtual channels, such that the user may perform the preview operation on the plurality of virtual channels through the preview channel.

Next, in step S620, the preview and playback program 543 establishes a first video stream list 545 of the first virtual channel to link a plurality of first video streams, and the first video streams are independent from each other. In step S630, the preview and playback program 543 establishes a second video stream list 547 of the second virtual channel to link a plurality of second video streams, and the second video streams are independent from each other. Therein, the way to establish the first video stream list 545 and the second video stream list 547 is the same or similar to the aforementioned embodiment, and will not repeatedly described hereinafter. It is to be mentioned that the preview and playback program 543 may be implemented as one application, and the first video stream list 545 and the second video stream list 547 are established by such application. Alternatively, the preview and playback program 543 may be implemented as a plurality of applications, and the first video stream list 545 and the second video stream list 547 are established by different applications, and the present is not limited thereto.

Then, in step S640, the preview and playback program 543 establishes a preview list 549 of the preview channel. The preview list 549 records description information of each of a plurality of preview data. The preview data corresponds to at least one of the first video streams and at least one of the second video streams. It is to be mentioned that the preview list 549 may record the preview data of all of or a part of the video streams in the first virtual channel and the second virtual channel, which may be set by the user or the system, and the present invention is not limited thereto. For example, by using a setting of a search keyword, related video streams in the first virtual channel and the second virtual channel may be searched out, and the preview data of the related video streams is recorded in the preview list 549. Alternatively, the preview data of all video streams in the first virtual channel and the second virtual channel may be recorded in the preview list 549. That is to say, the content to be played by the preview channel may be determined by the preview and playback program 543 establishing the preview list 549 of the preview channel, including which video streams in the first virtual channel and the second virtual channel are to be previewed, in which style/manner each preview data is to be played and from where the preview and playback program 143 may obtain files of the preview data. For example, existing preview clips, a plurality of collected photos or a part of video streams captured from the completely video streams which are provided by the video stream service may be configured as the preview data.

In step S650, when the remote instruction receiving module 120 receives a preview data selection instruction corresponding to the preview channel, the preview and playback program 543 automatically obtains and continuously plays the preview data according to the preview list 549. In step S660, when the remote instruction receiving module 120 a preview data selection instruction corresponding to one of the preview data, the preview and playback program 543 recognizes the video stream corresponding to the preview data being selected as a selected video stream. Therein, the ways of playing the preview data and recognizing the selected video stream are the same or similar to the aforementioned embodiment and will not repeatedly described hereinafter. Then, in step S670, the preview and playback program 543 switches from the preview channel to the first virtual channel or the second virtual channel corresponding to the selected video stream, and then obtains and plays the selected video stream from one of the video stream services 160_1~160_P according to the first video stream list 545 or the second video stream list 547. That is to say, the preview and playback program 543 switches to the first virtual channel or the second virtual channel according to the channel where the selected video stream is located. In brief, if the selected video stream is one of the video streams in the first virtual channel, the channel watched by the user is switched from the preview channel to the first virtual channel. If the selected video stream is one of the video streams in the second virtual channel, the channel watched by the user is switched from the preview channel to the second virtual channel. Meanwhile, the source of the selected video stream may be acquired according to the first video stream list or the second video stream list to obtain and play the selected video stream.

Furthermore, in the present invention, the video streams provided by one or more video stream services are divided into a plurality of virtual channels. The user may establish a preview channel according to the his/her viewing habit so as to achieve quickly viewing a plurality of video streams in multiple virtual channels by viewing the preview channel and quick switch to one of the virtual channels to view the video streams. Thus, the convenience for the user to watch the video streams provided by the video stream services through the network may be improved.

Figure 7:
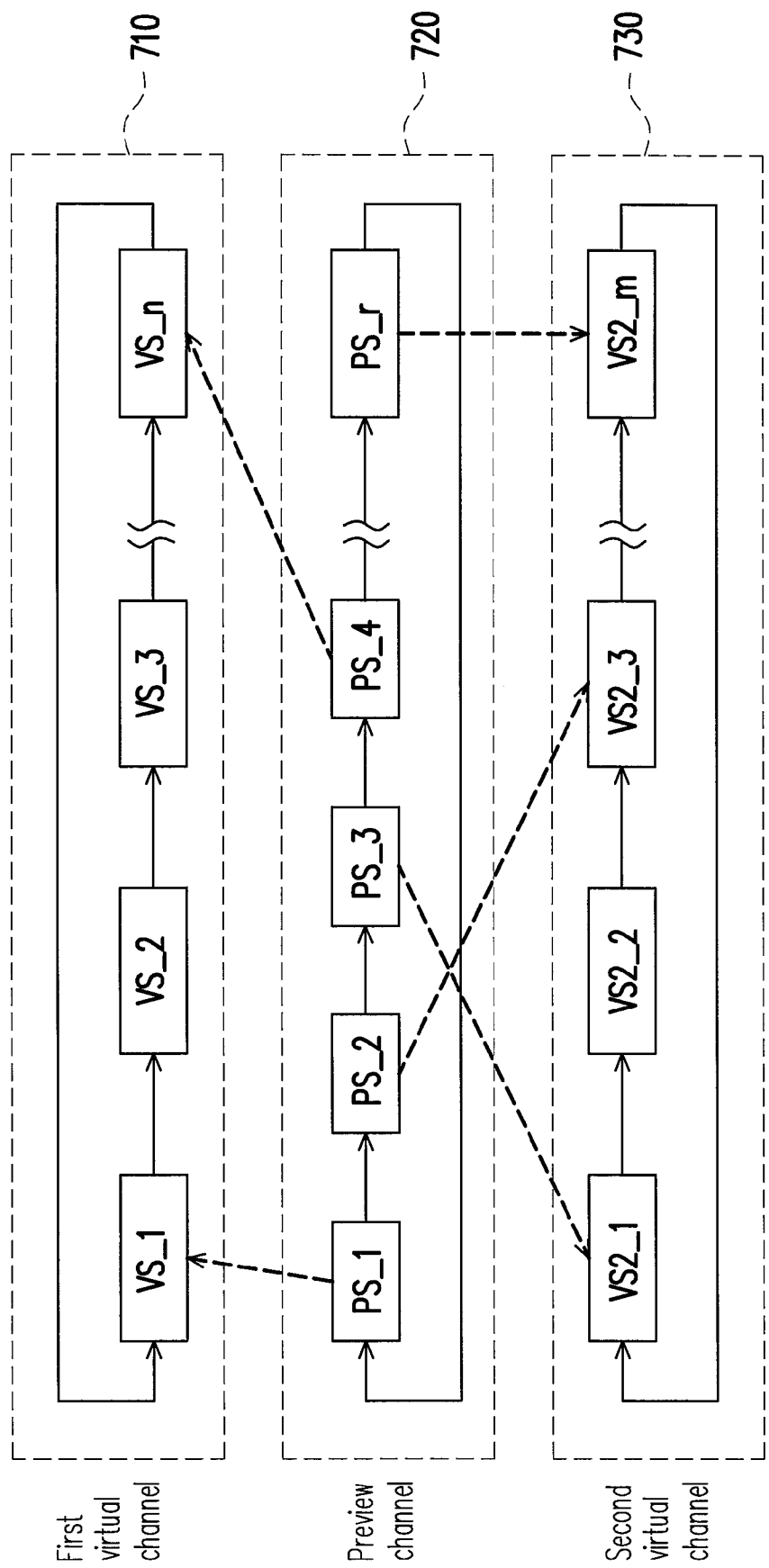
FIG. 7 is a schematic diagram of playing the preview data according to another embodiment of the present invention.

FIG. 7 is a schematic diagram of playing the preview data according to another embodiment of the present invention. Referring to FIG. 7, it is assumed that n video streams VS1_1 through VS1_n is linked by a first video stream list 710 of the first virtual channel, and m video streams VS2_1 through VS2_m is linked by a second video stream list 730 of the second virtual channel, then r preview data PS_1 through PS_r is linked by a preview list 720 of the preview channel. Therein, n and m are integers greater than 0, and r is an integer greater than 2.

When switching to the preview channel, the user may watch automatically and circulatively played preview data. While watching the preview data, the user may issue a preview data selection instruction to a video playback device, such as by pressing a confirm key or a select key on a remote control, and the video playback device switches from the preview channel to the first virtual channel or the second virtual channel and plays the corresponding complete video stream. For example, when the user presses the confirm key or the select key on the remote control while watching the preview data PS_1, the channel played by the video playback device is switched from the preview channel to the first virtual channel to start to play the video stream VS1_1. When the user presses the confirm key or the select key on the remote control while watching the preview data PS_2, the channel played by the video playback device is switched from the preview channel to the second virtual channel to start to play the video stream video stream VS2_3. When the user presses the confirm key or the select key on the remote control while watching the preview data PS_4, the channel played by the video playback device is switched from the preview channel to the first virtual channel to start to play the video stream video stream VS1_n.

It is learned from FIG. 7 that there is no certain corresponding relationship between the playback sequence of the preview data on the preview channel and the playback sequence of the video streams in the virtual channel. Each preview data has a flexible playback sequence in the preview channel, such that the user may set up the playback sequence of the preview data according to his/her preferable type, popularity of the video streams or the habit of watching video stream files. Additionally, the preview data type of each preview data may be different. Each preview data may be a preview clip provided by the video stream services, a related photo searched on the Internet or a capture clip generated by capturing a complete video stream.

Based on the above, in the preview and playback method of video streams of the present invention, the preview data of the video streams can be automatically and continuously played in the preview channel according to the corresponding relationship between the virtual channel and the preview channel. Thus, the user may directly view the preview data of a plurality of video streams to be played automatically and continuously, and therein, the video streams are independent from each other only by selecting the preview channel After the user selects the video stream to be actually viewed according to the preview data, the video playback device may quickly switch to the virtual channel and plays the video stream being selected by the user. In other words, the user neither performs the selection and playback operations on each of the video streams any longer nor switches among a plurality of channels to searching for the video stream that he/she desires to view but selects and views by a faster and more convenient way.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A preview and playback method of video streams, adapted to a video playback device having network function, comprising:

defining a virtual channel and a preview channel corresponding to the virtual channel;

establishing a video stream list of the virtual channel to link a plurality of video streams provided by one or more video stream services, wherein the plurality of video streams are independent from each other;

establishing a preview list of the preview channel, wherein the preview list records description information of each of a plurality of preview data corresponding to the plurality of video streams, and the step of establishing a preview list of the preview channel comprises:

establishing a preview rule to determine the plurality of preview data corresponding to each of the video streams, so as to obtain the description information of each of the plurality of preview data corresponding to the plurality of video streams, wherein the description information comprises a preview data type, a preview data playback manner and a preview data stored location, wherein the step of establishing the preview rule to determine the plurality of preview data corresponding to each of the video streams comprises: determining whether the video stream services provide preview video streams of the video streams; if yes, configuring the preview video streams of the video streams as the plurality of preview data; and if no, starting to search for images related to the video streams on the Internet and determining whether the images related to the video streams are collected;

when the video playback device receives a preview channel selection instruction corresponding to the preview channel, automatically obtaining the plurality of preview data according to the preview data stored location recorded in the preview list and continuously playing the plurality of preview data according to the preview data type and the preview data playback manner recorded in the preview list;

when the video playback device receives a preview data selection instruction corresponding to one of the plurality of preview data, recognizing the video stream corresponding to the preview data being selected as a selected video stream; and switching from the preview channel to the virtual channel, obtaining and playing the selected video stream from one of the one or more video stream services according to the video stream list.

2. The method according to claim 1, wherein the description information comprises a preview data identification code, a preview data playback length and a program name and a uniform resource locator (URL) of the corresponding video stream.

3. The method according to claim 2, wherein the preview data type corresponding to each of the plurality of preview data is identical or different.

4. The method according to claim 2, wherein the step of establishing the preview list of the preview channel comprises:

regarding to each of the video streams, obtaining the description information from the video stream service providing the video stream, generating the description information from a search result or generating the description information according to the video stream.

5. The method according to claim 2, wherein the step of automatically obtaining the plurality of preview data according to the preview data stored location recorded in the preview list and continuously playing the plurality of preview data according to the preview data type and the preview data playback manner recorded in the preview list when the video playback device receives the preview channel selection instruction corresponding to the preview channel comprises:
choosing current preview data from the plurality of preview data;
obtaining the current preview data according to the preview data stored location corresponding to the current preview data;
playing the current preview data according to the preview data playback length, the preview data type and the preview data playback manner corresponding to the current preview data; and
repeating the steps of choosing the current preview data, obtaining the current preview data and playing the current preview data until the playback of all the plurality of preview data is finished.

6. The method according to claim 2, wherein the step of switching from the preview channel to the virtual channel, obtaining and playing the selected video stream from the one or more video stream services according to the video stream list comprises:
sending a request of the URL corresponding to the selected video stream to the video stream service providing the selected video stream through a network so as to play the selected video stream on the video playback device in real time.

7. The method according to claim 1, wherein sequences of the plurality of preview data in the preview list are identical to or different from sequences of the plurality of video streams in the virtual channel.

8. The method according to claim 1, wherein sequences of the plurality of preview data in the preview list depend on at least one of a length, a view rate and a recommended rate of the corresponding video stream.

9. A preview and playback method of video streams, adapted to a video playback device having network function, comprising:
defining a first virtual channel, a second virtual channel and a preview channel corresponding to the first virtual channel and the second virtual channel;
establishing a first video stream list of the first virtual channel to link a plurality of first video streams, wherein the plurality of first video streams are independent from each other;
establishing a second video stream list of the second virtual channel to link a plurality of second video streams, wherein the plurality of second video streams are independent from each other;
establishing a preview list of the preview channel, wherein the preview list records description information of each of a plurality of preview data, and the plurality of preview data correspond to at least one of the plurality of first video streams and correspond to at least one of the plurality of second video streams, and the step of establishing a preview list of the preview channel comprises:
establishing a preview rule to determine the plurality of preview data corresponding to each of the first video streams and each of the second video streams, so as to obtain the description information of each of the plurality of preview data corresponding to the plurality of first video streams and the plurality of second video streams, wherein the description information comprises a preview data type, a preview data playback manner and a preview data stored location,
wherein the step of establishing the preview rule to determine the plurality of preview data corresponding to each of the first video streams and each of the second video streams comprises: determining whether the video stream services provide preview video streams of the first video streams and the second video streams; if yes, configuring the preview video streams of the first video streams and the second video streams as the plurality of preview data; and if no, starting to search for images related to the first video streams and the second video streams on the Internet and determining whether the images related to the first video streams and the second video streams are collected;
when the video playback device receives a preview channel selection instruction corresponding to the preview channel, automatically obtaining the plurality of preview data according to the preview data stored location recorded in the preview list and continuously playing the plurality of preview data according to the preview data type and the preview data playback manner recorded in the preview list;
when the video playback device receives a preview data selection instruction corresponding to one of the plurality of preview data, recognizing the video stream corresponding to the preview data being selected as a selected video stream; and
switching from the preview channel to the first virtual channel or the second virtual channel corresponding to the selected video stream, obtaining and playing the selected video stream from one of the one or more video stream services according to the first video stream list or the second video stream list.

10. A preview and playback system of video streams, comprising:
a network interface;
a remote instruction receiving circuit, configured to receive remote signals sent from an apparatus and transform the received remote signals into corresponding operation instructions;
a non-volatile storage unit, recording a corresponding relationship between a virtual channel and a preview channel; and
a preview and playback module, coupled to the network interface, the remote instruction receiving circuit and the non-volatile storage unit, wherein the preview and playback module comprises:
a storage unit, recording a preview and playback program; and
one or a plurality of processing circuits, coupled to the storage unit, and accessing and executing the preview and playback program,
wherein the preview and playback program establishes a video stream list of the virtual channel to link a plurality of video streams provided by one or more video stream services, the plurality of video streams are independent from each other, the preview and playback program establishes a preview list of the preview channel, and the preview list records description information of each of a plurality of preview data corresponding to the plurality of video streams, wherein the preview and playback program establishes a preview rule to determine the plurality of preview data corresponding to each of the video streams, so as to obtain the description information of each of the plurality of preview data corresponding to the plurality of video streams, wherein the description information comprises a preview data type, a preview data playback manner, a preview data stored location, wherein the preview and playback program determines whether the video stream services provide preview video streams of the video streams; if yes, the preview and playback program configures the preview video streams of the video streams as the plurality of preview data; and if no, the preview and playback program starts to search for images related to the video streams on the Internet and determines whether the images related to the video streams are collected, wherein when the remote instruction receiving circuit receives a preview channel selection instruction corresponding to the preview channel, the preview and playback program automatically obtains the plurality of preview data according to the preview data stored location recorded in the preview list and continuously plays the plurality of preview data via the network interface according to the preview data type and the preview data playback manner recorded in the preview list, wherein when the remote instruction receiving circuit receives a preview data selection instruction corresponding to one of the plurality of preview data, the preview and playback program recognizes the video stream corresponding to the preview data being selected as a selected video stream, the preview and playback program switches from the preview channel to the virtual channel, automatically obtains and plays the selected video stream from one of the one or more video stream services via the network interface according to the video stream list.

11. The system according to claim 10, wherein the description information comprises a preview data identification code, a preview data playback length and a program name and a uniform resource locator (URL) of the corresponding video stream.

12. The system according to claim 11, wherein the preview data type corresponding to each of the plurality of preview data is identical or different.

13. The system according to claim 11, wherein regarding to each of the video streams, the preview and playback program obtains the description information from the video stream service providing the video stream, generating the description information from a search result or generating the description information according to the video stream.

14. The system according to claim 11, wherein the preview and playback program chooses current preview data from the plurality of preview data, obtains the current preview data according to the preview data stored location corresponding to the current preview data, plays the current preview data according to the preview data playback length, the preview data type and the preview data playback manner corresponding to the current preview data and repeats operations of choosing the current preview data, obtaining the current preview data and playing the current preview data until the playback of all the plurality of preview data is finished.

15. The system according to claim 11, wherein the preview and playback program sending a request of the URL corresponding to the selected video stream to the video stream service providing the selected video stream through the network interface so as to play the selected video stream in real time.

16. The system according to claim 10, wherein sequences of the plurality of preview data in the preview list are identical to or different from sequences of the plurality of video streams in the virtual channel.

17. The system according to claim 10, wherein sequences of the plurality of preview data in the preview list depend on at least one of a length, a view rate and a recommended rate of the corresponding video stream.

18. A preview and playback system of video streams, comprising:
a network interface;
a remote instruction receiving circuit, configured to receive remote signals sent from an apparatus and transform the received remote signals into corresponding operation instructions;
a non-volatile storage unit, recording a corresponding relationship between a first virtual channel and a preview channel and a corresponding relationship between a second virtual channel and the preview channel; and
a preview and playback module, coupled to the network interface, the remote instruction receiving circuit and the non-volatile storage unit, wherein the preview and playback module comprises:
a storage unit, recording a preview and playback program; and
one or a plurality of processing circuits, coupled to the storage unit, and accessing and executing the preview and playback program, wherein the preview and playback program establishes a first video stream list of the first virtual channel to link a plurality of first video streams independent from each other, a second video stream list of the second virtual channel to link a plurality of second video streams independent from each other and a preview list of the preview channel, and the preview list records description information of each of a plurality of preview data, and the plurality of preview data corresponds to at least one of the plurality of first video streams and at least one of the plurality of second video streams, wherein the preview and playback program establishes a preview rule to determine the plurality of preview data corresponding to each of the first video streams and each of the second video streams, so as to obtain the description information of each of the plurality of preview data corresponding to the plurality of first video streams and the plurality of second video streams, wherein the description information comprises a preview data type, a preview data playback manner, a preview data stored location, wherein the preview and playback program determines whether the video stream services provide preview video streams of the first video streams and the second video streams; if yes, the preview and playback program configures the preview video streams of the first video streams and the second video streams as the plurality of preview data; and if no, the preview and playback program starts to search for images related to the first video streams and the second video streams on the Internet and determines whether the images related to the first video streams and the second video streams are collected, wherein when the remote instruction receiving circuit receives a preview channel selection instruction corresponding to the preview channel, the preview and playback program automatically obtains the plurality of preview data according to the preview data stored location recorded in the preview list and continuously plays the plurality of preview data via the network interface according to the preview data type and the preview data playback manner recorded in the preview list, when the remote instruction receiving circuit receives a preview data selection instruction corresponding to one of the plurality of preview data, the preview and playback program recognizes the video stream corresponding to the preview data being selected as a selected video stream, switches from the preview channel to the first virtual channel or the second virtual channel corresponding to the selected video stream, automatically obtains and plays the selected video stream from one of the one or more video stream services via the network interface according to the video stream list.

* * * * *